United States Patent [19]

Etievant et al.

[11] Patent Number: 5,020,061
[45] Date of Patent: May 28, 1991

[54] FREE ELECTRON LASER WITH A GASEOUS MEDIUM WIGGLER AND METHOD TO USE THIS LASER

[75] Inventors: Claude Etievant, Versailles, France; Hans Wilhelmsson, Gothenburg, Sweden

[73] Assignee: Commissariat A l'Energie Atomique, Paris, France

[21] Appl. No.: 556,463

[22] Filed: Jul. 24, 1990

[30] Foreign Application Priority Data

Jul. 25, 1989 [FR] France ................. 89 09991

[51] Int. Cl.⁵ .............................................. H01S 3/00
[52] U.S. Cl. ............................................ 372/2; 372/20; 372/37
[58] Field of Search ....................... 372/2, 20, 92, 37

[56] References Cited

U.S. PATENT DOCUMENTS 4,466,101 8/1984 Schoen ................................. 372/2

OTHER PUBLICATIONS

Reid et al.; "An Ultraviolet Gas-Loaded Free Electron Laser"; IEEE Jour. Quant. Elect., vol. 25, No. 1, Jan. 1989.

Article by R. H. Pantell et al., Journal of the Optical Society of America B; Optical Physics, vol. 6, No. 5, May 1989, pp. 1008–1014, Optical Society of America, Woodbury, N.Y., U.S.

Article by M. B. Reid et al., published in IEEE Journal of Quantum Electronics, vol. 5, No. 1, Jan. 1989, pp. 84 to 87.

*Primary Examiner*—Léon Scott, Jr.
*Attorney, Agent, or Firm*—Oblon, Spivak, McClelland, Maier & Neustadt

[57] ABSTRACT

Free electrons laser with gaseous medium wiggler and method to use this laser. The laser includes a chamber (22) designed to be traversed by a beam of previously accelerated electrons, a wiggler (44) which creates in this chamber a periodic magnetic field interacting with the beam of electrons, and means (54) to fill the chamber with a gas formed of atoms or molecules having at least one resonance line at a determined frequency. The laser is tuned on this resonance line, which enables the laser to produce a frequency light close to this determined frequency.

8 Claims, 6 Drawing Sheets

FREE ELECTRON LASER WITH A GASEOUS MEDIUM WIGGLER AND METHOD TO USE THIS LASER

FIELD OF THE INVENTION

The present invention concerns a free electron laser and a method to use this laser. This invention can be used in many fields, such as in chemical, telecommunications and surgical applications.

BACKGROUND OF THE INVENTION

It is known that a free electron laser is a high efficiency wavelength-tunable laser and is able to emit a high-powered electromagnetic radiation and, to this effect, uses the characteristic feature of a beam of relativistic electrons to emit a coherent electromagnetic radiation when it is subjected to a static yet spatially periodic magnetic field generated by a device known as a wiggler.

Such a laser may be an amplifier and function without any optical cavity, or an oscillator in which an optical cavity is required so as to trap the radiation emitted by the beam of relativistic electrons.

Various free electron lasers are described in an article (1) by C. W. Robertson and al. and entitled "A review of free electron lasers" and published in the Physics of fluids journal, B1, January 1989.

Existing free electron lasers have the drawback of requiring beams of electrons with extremely high energy and thus expensive accelerators and thick protection devices so as to obtain electromagnetic radiations with short wavelengths.

There is also an existing free electrons laser disclosed by an article (2) by R. H. Pantell and al, Journal of the optical society of America B: optical physics, vol. 6, No. 5, May 1989, p. 1008 to 1014 and by an article (3) by M. B. Reid and al., IEEE Journal of quantum electronics, vol. 5, No. 1, Jan. 1989, p. 84 to 87, these articles to be referred to subsequently, the tuning condition of this free electrons laser being modified by introducing a gas into the wiggler of the laser.

However, a considerable modification of the tuning condition requires high gas pressure, which results in the wiggler having to be materially separated from the pipe linking the latter to the electrons accelerator associated with the laser.

SUMMARY OF THE INVENTION

The object of the present invention is to overcome the drawbacks mentioned above.

The aim of the invention is to provide a free electron laser including:

a principal chamber designed to be traversed by a beam of previously accelerated electrons, a wiggler which creates in this principal chamber a periodic magnetic field interacting with the beam of electrons, and means to fill the principal chamber with a gas formed of atoms or molecules possessing at least one resonance line at a determined frequency, wherein this laser further includes means to tune the laser to this resonance line, which enables the laser to produce a frequency light close to this determined frequency.

As shall be seen more clearly subsequently, the use of such as gas at the rate of a sufficiently high density (that is, a number of atoms or molecules per unit of volume) makes it possible to sufficiently increase the real part of the optical index of the medium contained in the cavity so as to obtain, without modifying the energy of the beam of electrons, an additional laser functioning "point" at a frequency higher than the tuning frequency obtained where the cavity is empty (the index being 1 in this latter case) by supposing said determined frequency is greater than this tuning frequency, which is almost always the case.

Thus, there is no longer any need to have high energy electrons so as to obtain a radiation with a short wavelength and it is possible to embody a free electron laser with power able to emit an infrared, visible or even ultraviolet radiation by simply using a beam of electrons whose energy is between 1 and several MeVs.

It is then possible to conceive of low-cost, powerful and compact radiation sources properly adapted to industrial use, this not being the case with existing known free electron lasers.

The invention functions that much better when the resonance line is intense and thus when the module of the dipole moment of the atoms or molecules for transition used between electronic levels is raised.

According to one particular embodiment of the laser of the invention, the means to fill the principal chamber with gas include means for the controlled feeding of this principal chamber with said gas.

The principal chamber may be fed with gas at one of its extremities.

This extremity may be the extremity via which the beam of electrons leaves the principal chamber.

Preferably, as the beam of electrons originates from an electrons accelerator, the laser further includes a differential pumping chamber which connects the principal chamber to a pipe forming part of the accelerator so as to avoid having the gas polluting the electrons accelerator which is under vacuum.

The laser of the present invention may further include means for recovering the beam of electrons once it has left the principal chamber.

The laser then preferably further includes another differential pumping chamber which connects the principal chamber to the means for recovering the beam of electrons so as to avoid the principal chamber being polluted by ions possibly originating from the recovery means. In fact, when the latter include, for example, a target, this target emits retrodiffused ions under the impact of the beam of electrons and said other differential pumping chamber prevents these retrodiffused ions from going into the principal chamber.

The present invention also concerns a method to use a free electron laser and including:

a principal chamber tranversed by a beam of previously accelerated electrons, and a wiggler which creates in this principal chamber a periodic magnetic field interacting with the beam of electrons, a method by which the principal chamber is filled with a gas formed of atoms or molecules having at least one resonance line at a determined frequency, wherein this method tunes the laser to this resonance line, which enables the laser to produce a frequency light close to this determined frequency.

The laser is preferably approximately tuned on the wavelength corresponding to the maximum of the curve representing the variations of $(n_r-1)$ according to the wavelength close to resonance where $n_r$ is the real part of the gas refraction index.

Finally, the gas may be an active gas in which a population inversion of electronic levels is able to be embodied, but preferably the gas is a passive gas in which a population inversion of electronic levels cannot be realized, which simplifies implementation of the present invention.

BRIEF DESCRIPTION OF THE DRAWINGS

The invention shall be more readily understood from a reading of the following description, given purely by way of illustration and being in no way restrictive, with reference to the accompanying drawings in which.

DETAILED DESCRIPTION OF THE PREFERRED EMBODIMENTS

Figure 1:
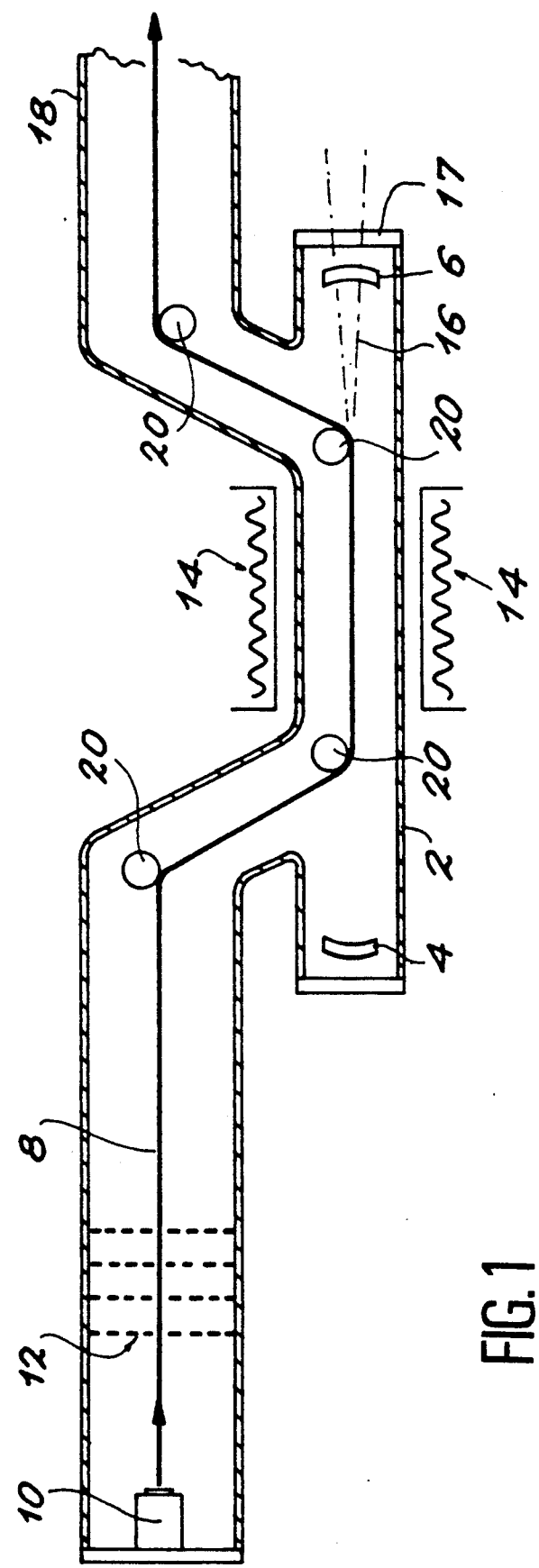
FIG. 1 is a diagrammatic view of a known free electron laser.

FIG. 1 diagrammatically represents an existing known free electron laser including a vacuum chamber 2 with mirrors 4 and 6 being placed at the two extremities of this chamber. One of these mirrors is semi-transparent. A beam of relativistic electrons 8, originating from an electron accelerator including an electron gun 10 and accelerating sections 12, is deflected towards the vacuum chamber where it interacts with a periodic magnetic field generated by a magnetic wiggler 14 so as to produce a radiation 16 which partly traverses the semi-transparent mirror 6 and then a window 17. After having traversed the interaction zone, the beam of electrons 8 is deflected outside the chamber 2 so as to extend into an under vacuum pipe 18. The various deflections of the beam of electrons towards the vacuum chamber 2 and outside the latter are obtained with the aid of magnets or suitable magnetic coils 20.

In a laser of this type, the emitting medium is constituted by the beam of relativistic electrons. The tuning condition of the free electron laser is written:

$$13 = 11(2\ g^2)^{-1}(1 + M^2/2) \tag{1}$$

with=

11: wavelength of magnetic wiggler
13: wavelength of emitted radiation
g: $(m.c^2)/(mo.c^2)$
M: $e.B1.11.(2.pi.mo.c)^{-1}$
B1: magnetic induction generated by wiggler
c: speed of the light in a vacuum
e: electron load
mo: mass of electron at rest
m: mass of electron (moving)
pi: clearly known number worth about 3.14.

The relation (1) represents the synchronism condition allowing for a resonant coupling between the space load fluctuations of the beam of electrons, the magnetic wiggler and the emitted electromagnetic wave. This relation (1) shows that two parameters enabling 13 to be varied are the wavelength 11 of the wiggler and the energy E of the beam of electrons measured by the parameter g.

In practice, for a determined free electron laser, 11 constitutes a parameter for constructing the magnetic wiggler and, owing to this, remains fixed. The current technology of magnetic wigglers makes it possible to give 11 a value ranging from 1 to several centimeters.

Thus, the only really free parameter for tuning the laser is the energy of the electrons.

By taking 11=2 cm and B1=0.1T, it can be seen that the values of g to be obtained are:

$g \geq 10$, namely $E \geq 5.1$ MeV so as to have $13 \geq 100$ micrometers $g \geq 100$, namely $E \geq 51$ MeV so as to have $13 \geq 1$ micrometer $g \geq 316$, namely $E \geq 161$ MeV so as to have $13 \geq 0.1$ micrometers.

These values show the need to use highly energetic electronic beams of about 50 MeV or more so as to reach near-infrared, the visible spectrum or ultraviolet.

It is possible to interpret the relation (1) as a condition of synchronism between three non-linearly coupled waves:

the magnetic wiggler is characterized by a frequency (or more precisely a pulsation) w1=0 and by a wavelength 11, the density fluctuations of the beam are characterized by a frequency w2 and by a wavelength 12, and the electromagnetic wave produced is characterized by a frequency w3 and by a wavelength 13.

This synchronism condition is written:

$$w3 = w2 + w1 \text{ and } K3 = K2 + K1 \tag{2}$$

where K1, K2 and K3 are wave numbers measured algebraically along the axis of the beam in the vacuum chamber, with:

$$|K1| = 2pi/11 \ |K2| = 2pi/12 \ |K3| = 2pi/13$$

The propagation of waves is made along this axis.

In the relations (2), it is necessary to add the following three dispersion relations:

for the wiggler:

$$w1 = 0 \text{ and } K1 = \pm 2pi/11 \tag{3}$$

for the plasma mode of the beam:

$$w2 = K2.b.c \pm wp \tag{4}$$

for the electromagnetic wave:

$$w3 = K3.c \tag{5}$$

relations in which the product b.c and the number wp respectively represent the speed of the electrons of the beam and the actual frequency of this beam, with:

$$wp^2 = 4pi.N.e^2.mo^{-1}.g^{-1}$$

It shall be observed that wp is much smaller than w2 so that w2 hardly differs from K2.b.c.

Figure 2:
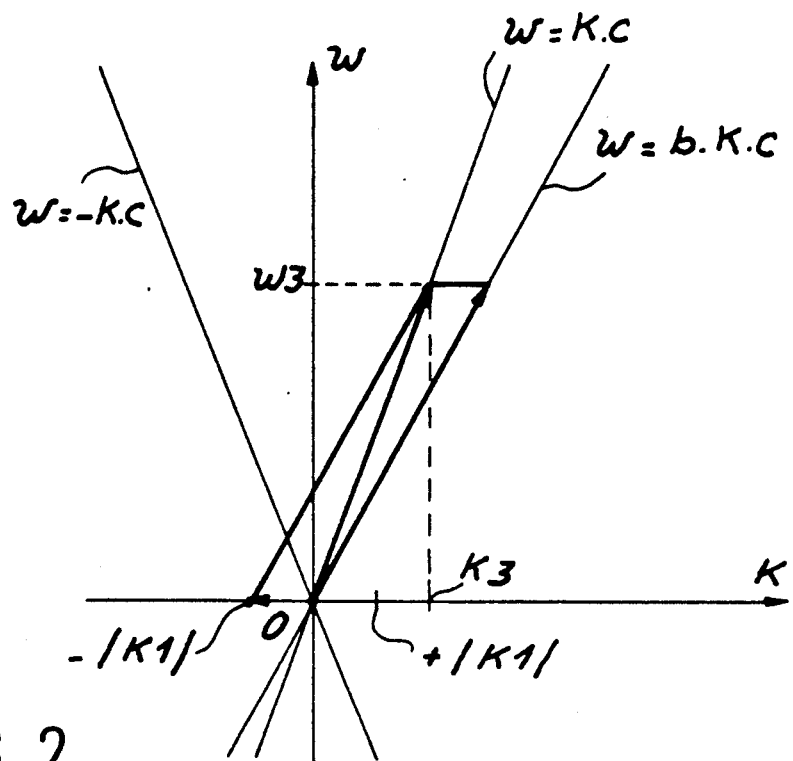
FIG. 2 is a graph making it possible to determine the wave vector and the radiation frequency emitted by such a known laser.

FIG. 2 shows a graphic construction making it possible to determine the vector (w3, K3) representing the electromagnetic wave emitted by the free electron laser and satisfying the unit formed by the synchronism condition (2) and the dispersion relations (3), (4) and (5).

This graphic construction is embodied in a cartesian marker (w, K). The electromagnetic waves are represented by the two straight lines $w = \pm K.c$. The plasma modes of the beam are represented by the straight line $w = b.K.c \pm wp$ when merged with the straight line $w = b.K.c$ since wp is much smaller than w2.

The wiggler is a magnetic, periodic and stationary perturbation in the marker of the laboratory. This perturbation is represented by the two waves (w1=0, +|K1|) and (w1=0, −|K1|).

In these conditions, the vector (w3, K3) representing the wave emitted by the laser is the sum of the two vectors (w1, −|K1|) and (w2, K2). It is necessary to ensure that the graphic construction of FIG. 2 strictly results in the solution defined by the equation (1) by supposing M to be much smaller than 1, which, generally speaking, is the case.

It is possible to modify the dispersion relation (5) of the electromagnetic wave by "loading" the emitting medium with resonant oscillators constituted by a gas of atoms or molecules having at least one preferably intense resonance line. It is, for example, possible to use the yellow sodium vapor line, whose wavelength is 589 nm.

The principle of the construction represented on FIG. 2 remains valid in this case, but it is now necessary to replace the dispersion relation (5) with a suitable relation expressing the modifications of the relation (5) in the vicinity of the atomic or molecular resonance line.

In the vicinity of such a resonance line whose central frequency is marked wo, the refraction index letter n of the gas is a complex number whose real part is marked nr and whose imaginary part is marked ni, with $$nr - 1 = -(\tfrac{1}{2})wp(i,j)^2 . wo^{-2} . (D/wo) . F^{-1} \quad (6)$$

$$ni = (\tfrac{1}{2})wp(i,j)^2 . wo^{-2} . (v/wo) . F^{-1} \quad (7)$$

with: $F = (D^2/wo^2) + (v^2/wo^2)$ \quad (8)

In these formulae, v is the characteristic damping constant, D is equal to w−wo and wp(i,j) is the atomic or molecular "plasma" frequency for the considered transition in the gas from one determined electronic level i to another determined electronic level j. The following can be written:

$$wp(i,j)^2 = |Mij|^2 . (Ni - Nj) . (6Eo(h/2pi))^{-1}$$

a formula in which h, Eo, Ni, Nj and |Mij| respectively represent the PLANCK constant, the dielectric constant of the vacuum, the population of the level i and the gas in question, the population of the level j in this gas and the module of the dipole moment for the transition from i to j.

Figure 3A:
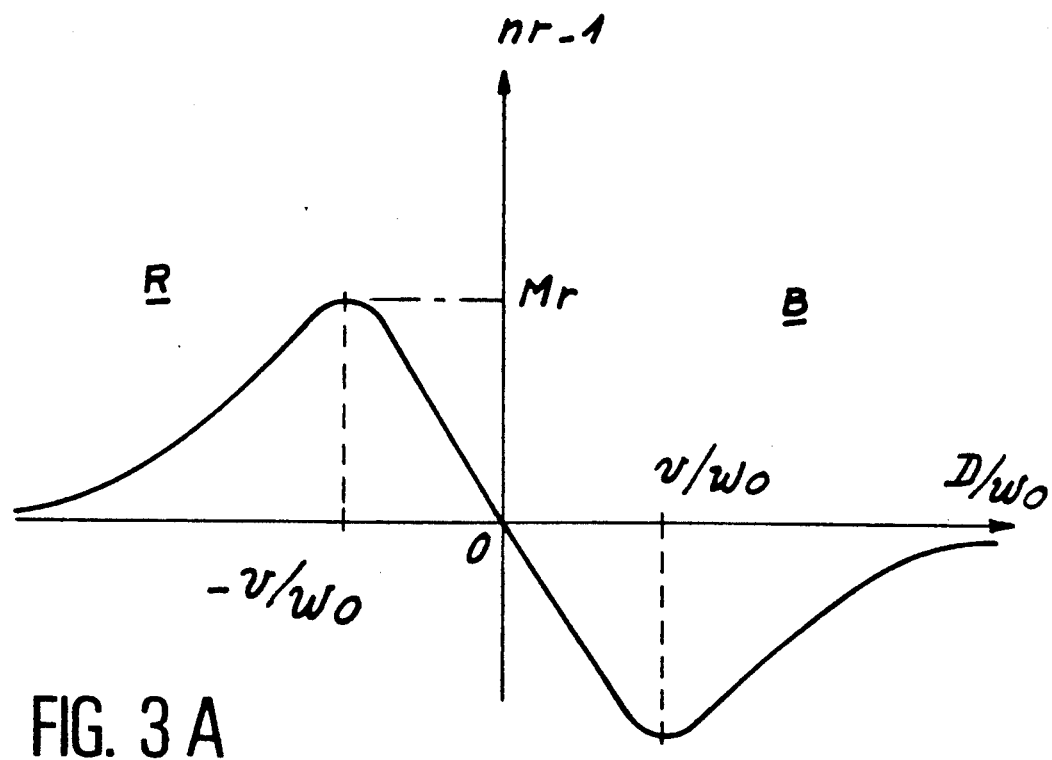
FIG. 3a represents the curve of the variations of nr−1 according to (w−wo)/wo where nr, wo and w respectively represent the real part of the optical index of a gas used in a laser conforming to the present invention, the central frequency of the resonance line of the gas and a frequency close to wo.
Figure 3B:
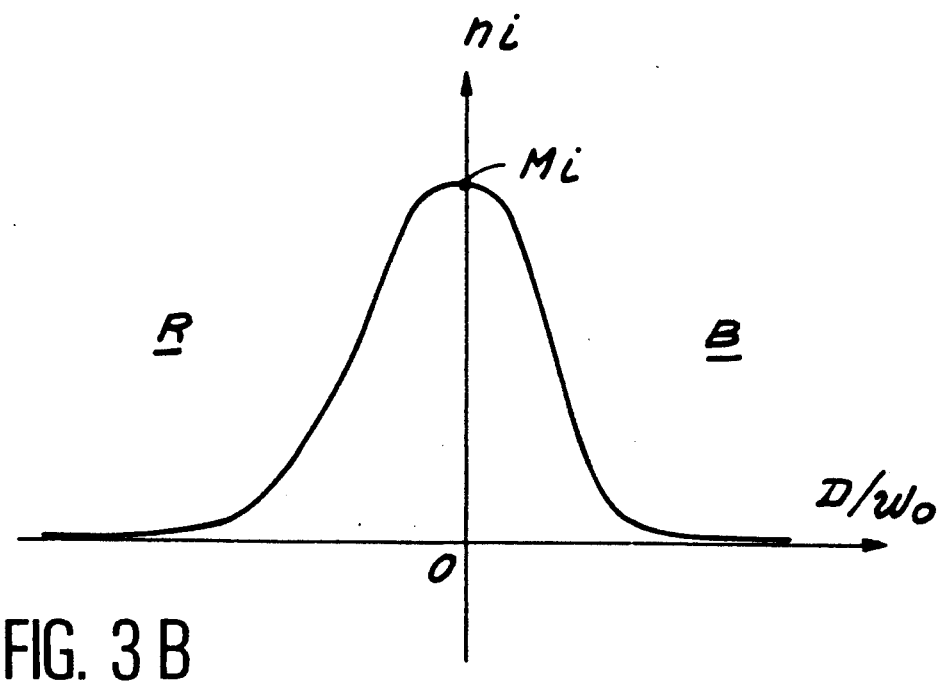
FIG. 3b represents the curve of the variations of ni according to (w−wo)/wo where ni represents the imaginary part of the optical index of this gas.

FIGS. 3A and 3B represent the respective variations of nr−1 and ni according to D/wo for a frequency w close to wo.

The following facts can be clearly established:

If wp(i,j)² is positive, that is if Ni is greater than Nj (no population inversion), nr−1 passes through a maximum Mr for D=−v, with:

$$Mr = (\tfrac{1}{2})wp(i,j)^2 . wo^{-2} . (wo/2v)$$

and, more generally, nr is greater than 1 on the "red" resonance (D<0) side marked R. Accordingly, $K = w.nr.c^{-1}$ takes a value greater than the corresponding value in the vacuum (where n=1). It is possible to write that the increasing of the wave number resulting from this is approximately equal to:

$$dK = (\tfrac{1}{2}) . wp(i,j)^2 . (v.c)^{-1} \quad (9)$$

On the "blue" resonance side (marked B), it can be observed that there is a reduction of the index nr, which corresponds to an increase of the phase speed of the wave and a reduction of K.

In wo, the real part of the index is annulled and the imaginary part passes through a maximum MI, which expresses an absorption maximum at the frequency wo. The number Mi is equal to:

$$(\tfrac{1}{2})wp(i,j)^2 . wo^{-1} . (wo/v)$$

It is also possible to consider the case of a gas in which a population inversion would have been carried out, which would be expressed by Ni<Nj, hence wp(i,j)²<0.

Such a situation is encountered in gas lasers. The gas is then called active. In this instance, it can be established, contrary to the preceding case, that the imaginary part of the refraction index noted ni becomes negative, which means that the gas becomes emitting in the vicinity of wo. Furthermore, on the "red" resonance side R, the real part nr of the index becomes lower than 1 (fast waves such as w/K>c) and, on the "blue" resonance side B, it assumes values greater than 1 (slow waves such as w/K<c).

Thus, it can be seen how advantageous is this increase of the index dnr so that: dnr=nr−1>0.

This increase occurs on the "red" resonance side in the case where a passive gas (wp(i,j)²>0) and on the "blue" resonance side in the case of an active gas (wp(i,j)²<0).

Figure 4:
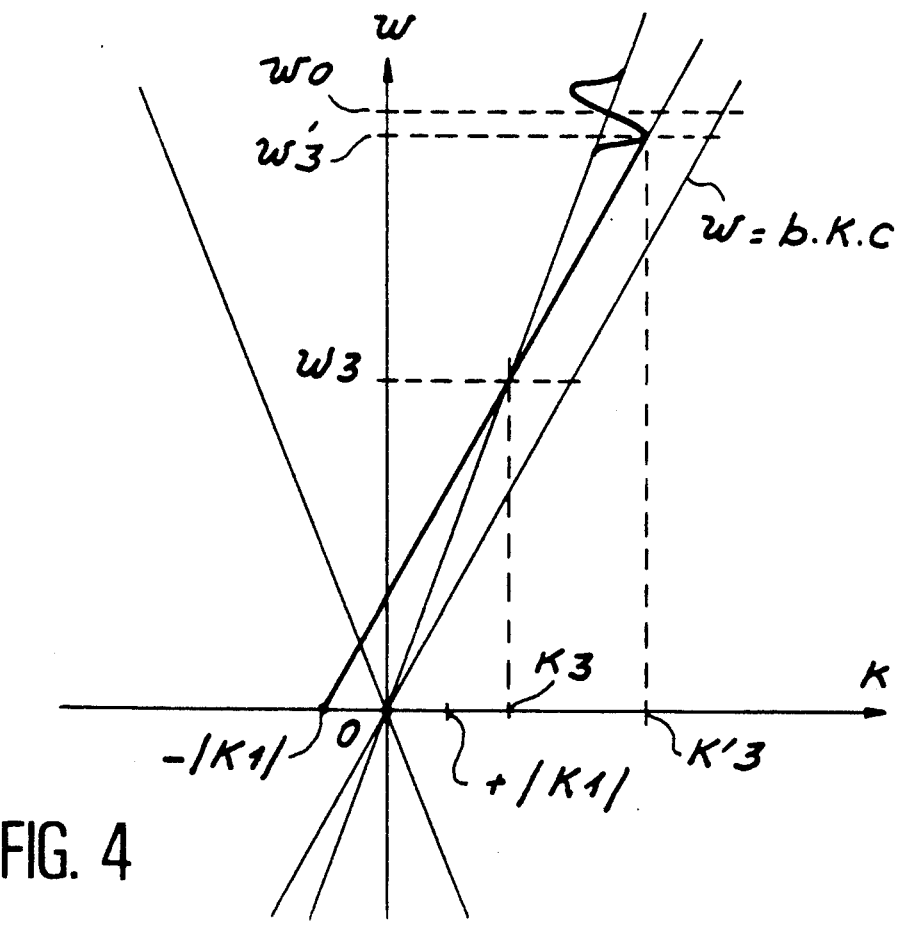
FIG. 4 illustrates the modification of the graph of FIG. 2 when such a gas is used in accordance with the present invention.

In particular, this index variation in the vicinity of the resonance wo makes it possible to establish new ranges for synchronizing free electron lasers, as shown on FIG. 4.

As on FIG. 2, FIG. 4 shows the graphic construction making it possible to determine the representative points such as (W3, K3) whose synchronism conditions are satisfied.

The dispersion curve of the electromagnetic waves now reveals the variation dK mentioned earlier in the vicinity of the resonance line in question (w=wo).

In particular, it can be seen that the presence of this resonance causes a new synchronism point (w'3, K'3) to appear whose laser is tuned. This point is located on the "red" resonance side (w'3<wo) in the case of a passive gas (wp(i,j)²>0) and on the "blue" side (w'3>wo) in the case of an active gas (wp(i,j)²<0).

It shall be observed that w'3 is close to wo. Thus, by selecting a gas so that wo is more than W3 (most usable gases in the invention satisfy this condition), the invention effectively allows a light emission at a frequency greater than the one obtained with a conventional free electron laser (functioning in a vacuum) for a given energy mc² of the beam of electrons.

The conditions of existence of one solution to the synchronism condition in the presence of resonant oscillators is simply written by expressing that the dispersion curve of the electromagnetic waves, that is a curve which is modified by the resonance wo, cuts the straight line representative of the beam of electrons (w=b.K.c.) offset by the vector translation (w1=0, K1=−|K1|). The condition is written as follows:

$$dk \geq (w'3/c)(b^{-1}-1) - |K1| \qquad (10)$$

where dK is defined by the relation (9).

Furthermore, w′3 is close to wo, which makes it possible to write the inequality (10) in the form of:

$$wp(i,j)^2 \geq 8v.c.((wo/c).(b^{-1}-1) - |K1|) \qquad (11)$$

In particular, the inequality (11) makes it possible to evaluate the minimum density of the gas constituted by resonant molecules and atoms per unit of volume allowing for a sufficient index variation so that the free electron laser of the invention is able to emit at a frequency w′3 close to the resonance frequency wo.

Figure 5:
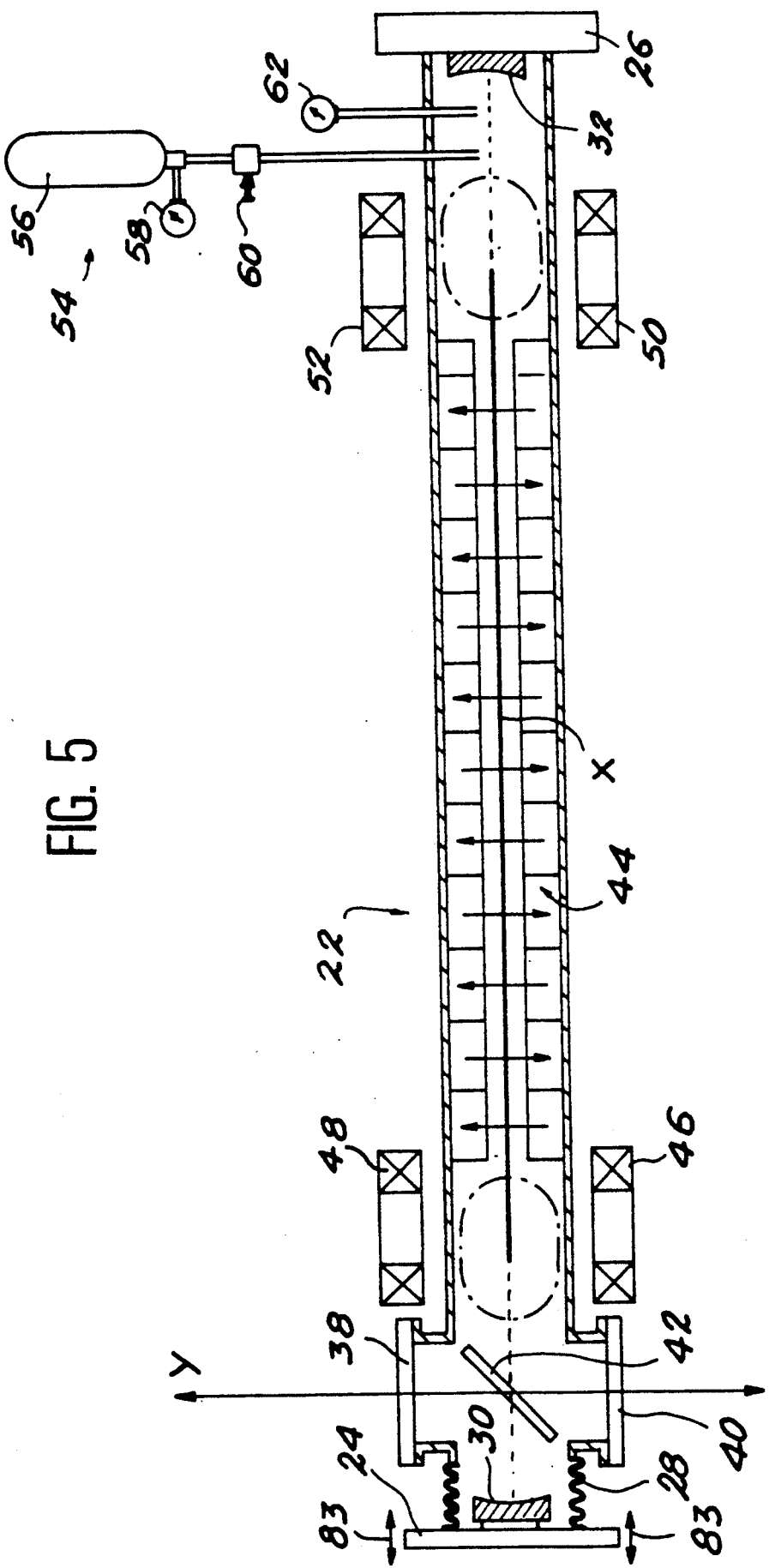
FIG. 5 is a diagrammatic cutaway view of a laser conforming to the invention.
Figure 6:
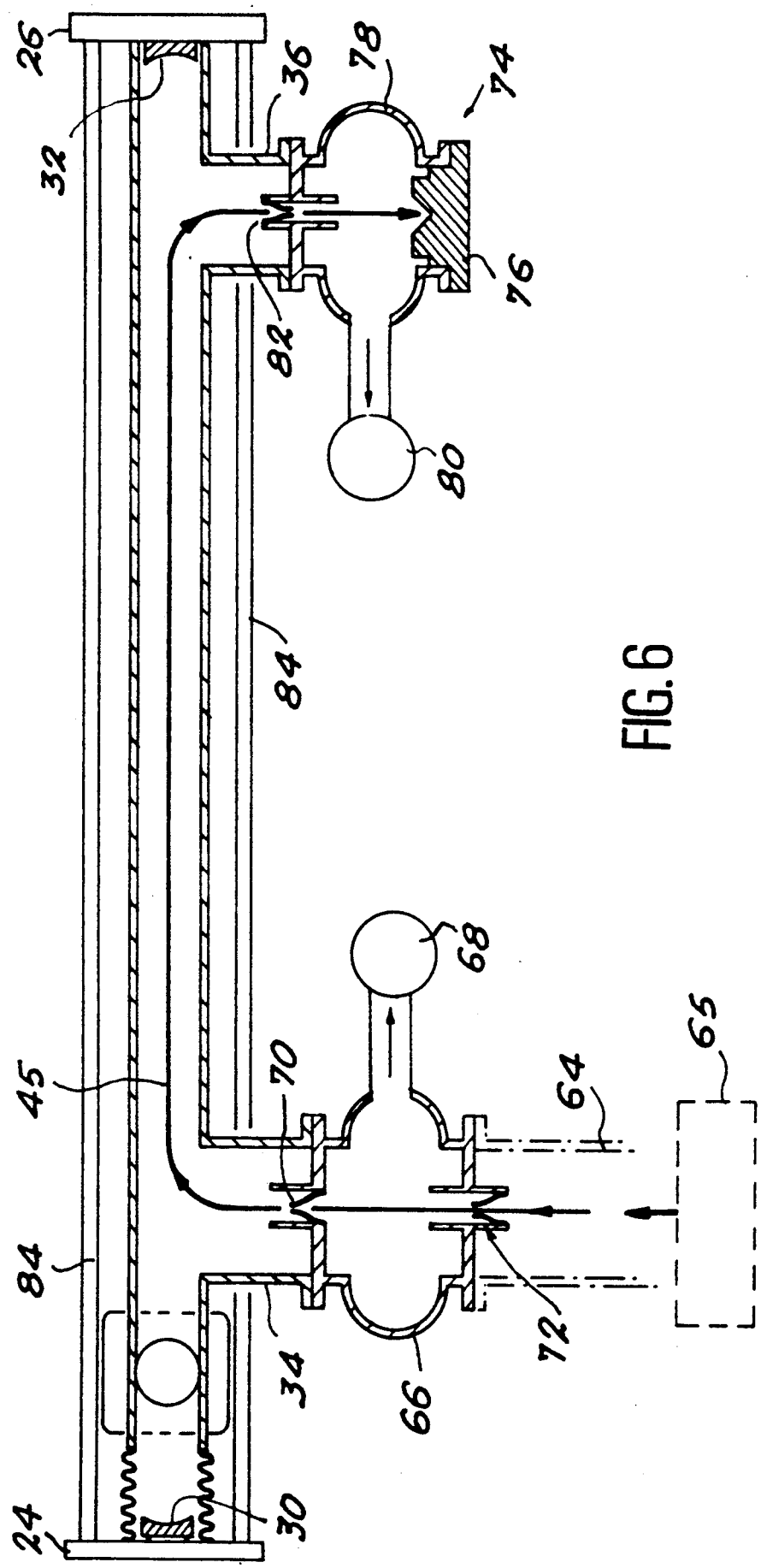
FIG. 6 is a diagrammatic cutaway view of this laser along a plane perpendicular to the plane of FIG. 5.

FIGS. 5 and 6 diagrammatically show a particular embodiment of the free electron laser of the invention. These FIGS. 5 and 6 are cutaway views along planes perpendicular to each other.

The laser represented on these figures includes an elongated principal chamber 22 along an axis X. At its two extremities, the principal chamber is closed by flanges 24 and 26. In fact, on the side of the flange 24, the linking of the chamber to the latter is effected by means of ductile bellows 28 parallel to the axis X.

The laser also includes two focussing mirrors 30 and 32 both having the axis X as a common axis. These mirrors are respectively borne by the internal faces of the flanges 24 and 26 and are provided so as to reflect along the axis X the light generated in the principal chamber 22 of the laser.

In addition, the principal chamber 22 is respectively connected at its two extremities to two pipes 34 and 36 (FIG. 6) whose axes are parallel to each other and perpendicular to the axis X.

The pipe 34 is situated on the side of the bellows 28.

In the portion of the principal chamber 22 between these bellows and the pipe 34, the principal chamber 22 is provided with wo windows 38 and 40 which are diametrically opposite with respect to the axis X and have a common axis Y perpendicular to X and to the axes of the pipes 34 and 36. The windows are transparent to the radiation generated by the laser. One extraction plate 42 which, in the plane of FIG. 5 is at the intersection of the axes X and Y and 45° from each of the latter, is provided to send this radiation along the axis Y through the two windows.

In the portion of the principal chamber 22 between the two pipes 34 and 36, the laser comprises a magnetic wiggler 44 whose length may be about 1 m.

This wiggler, for example, includes along the axis X and inside the principal chamber 22 one series of magnet pairs opposite each other, this series creating magnetic fields parallel to Y and whose directions are alternate.

The beam of electrons 45 designed to interact with the periodic magnetic field generated by the wiggler 44 traverses the pipe 34 before penetrating into the principal chamber 22, then traverses the latter and comes out of it by penetrating into the pipe 36. To this effect, two pairs of deflection coils 46–48 and 50–52, fed by means (not shown), are respectively provided at the junction point between the pipe 34 and the principal chamber 22 and at the junction point between the latter and the pipe 36. The two coils of each pair have a given axis parallel to the axis Y and are on both sides of the principal chamber 22, as can be seen on FIG. 5.

At least opposite the coils, the principal chamber 22 is made of a non-magnetic material.

In accordance with the invention, the laser represented on FIGS. 5 and 6 includes means 54 for feeding the principal chamber 22 with a gas of atoms or molecules having an intense resonance line. These means 54 include, for example, a reservoir 56 containing the gas and provided with a manometer 58 and connected to the principal chamber 22 via a pipe provided with a precision needle valve tap 60 and ending at the principal chamber 22 in the zone of the latter between the junction point with the pipe 36 and the flange 26. In this zone, a pressure measuring gauge 62 is also mounted on the principal chamber 22.

The pressure in the principal chamber 22 may be between about $10^{-5}$ Pa and $10^{-1}$ Pa.

The pipe 34 communicates by means of a differential pumping chamber 66 with a pipe 64 where the vacuum is created and which forms part of the electrons accelerator and which is traversed by the beam of relativistic electrons supplied by this accelerator. The chamber 66 is provided with suitable pumping means 68 and pumping speed reducing diaphragms 70 and 72 are respectively provided between the chamber 66 and the pipe 34 and between the pipe 64 and the chamber 66. This chamber 66, supplied with the means 68 and the diaphragms 70 and 72, is provided to retain the vacuum in the pipe 64.

At the outlet of the pipe 36, the beam of electrons is sent onto the beam recovery means 74, these means being constituted, for example, by a suitable target 76.

This target is sealed-connected to the pipe 36 by means of another differential pumping chamber 78 provided with pumping means 80. A pumping speed reducing diaphragm 82 is provided between the pipe 36 and the chamber 78. The chamber 78, supplied with the pumping means 80 and the diaphragm 82, is provided to prevent the principal chamber 22 from being polluted by the material of the target 76, a material which is likely to be ejected from the latter under the impact of the beam of electrons.

When the laser is functioning, the distance between the mirrors 30 and 32 is adjusted so that the intensity of the luminous beam derived from either of the windows 38 and 40 is maximal (the optical frequency of this beam then corresponding to the maximum of the curve of the variations of nr−1 according to the frequency, this curve relating to the gas used). This adjustment is carried out by moving the flange 24 by means of mechanical screw devices symbolized by the arrows 83 on FIG. 5. When the distance between the mirrors 30 and 32 is optimal, this distance is fixed by inserting between the flanges 24 and 26 wavelength-stabilized silica bars intended to keep the distance between the flanges at the value found at the time of adjustment.

The laser shown in FIGS. 5 and 6 is an oscillator type laser. In order to obtain an amplifier type laser, it merely suffices to suppress the mirrors 30 and 32 and the plate 42 and placing opposite the flange 24 a luminous source which emits a beam along the axis X in the direction for displacement of the electrons in the wiggler, the optical frequency of this beam being equal to the frequency corresponding to the maximum of the curve of the variations of nr−1 according to the frequency (curve relating to the gas used) and of providing the flanges 24 and 26 with transparent windows at this frequency so as to obtain an amplified beam at the outlet of the flange 26.

Advantageously, the laser of the invention functions with a passive gas, which avoids having to carry out a population inversion and thus of having to use a gas or gas mixture allowing such an inversion (and exhibiting, for example, a combination of at least three electronic levels, as in gas lasers).

However, the laser of the invention also functions with an active gas in which a population inversion then needs to be realized. Such an inversion is able to be effected by any device of the type used in gas lasers or even by the beam of electrons which circulates in the wiggler.

Figure 7:
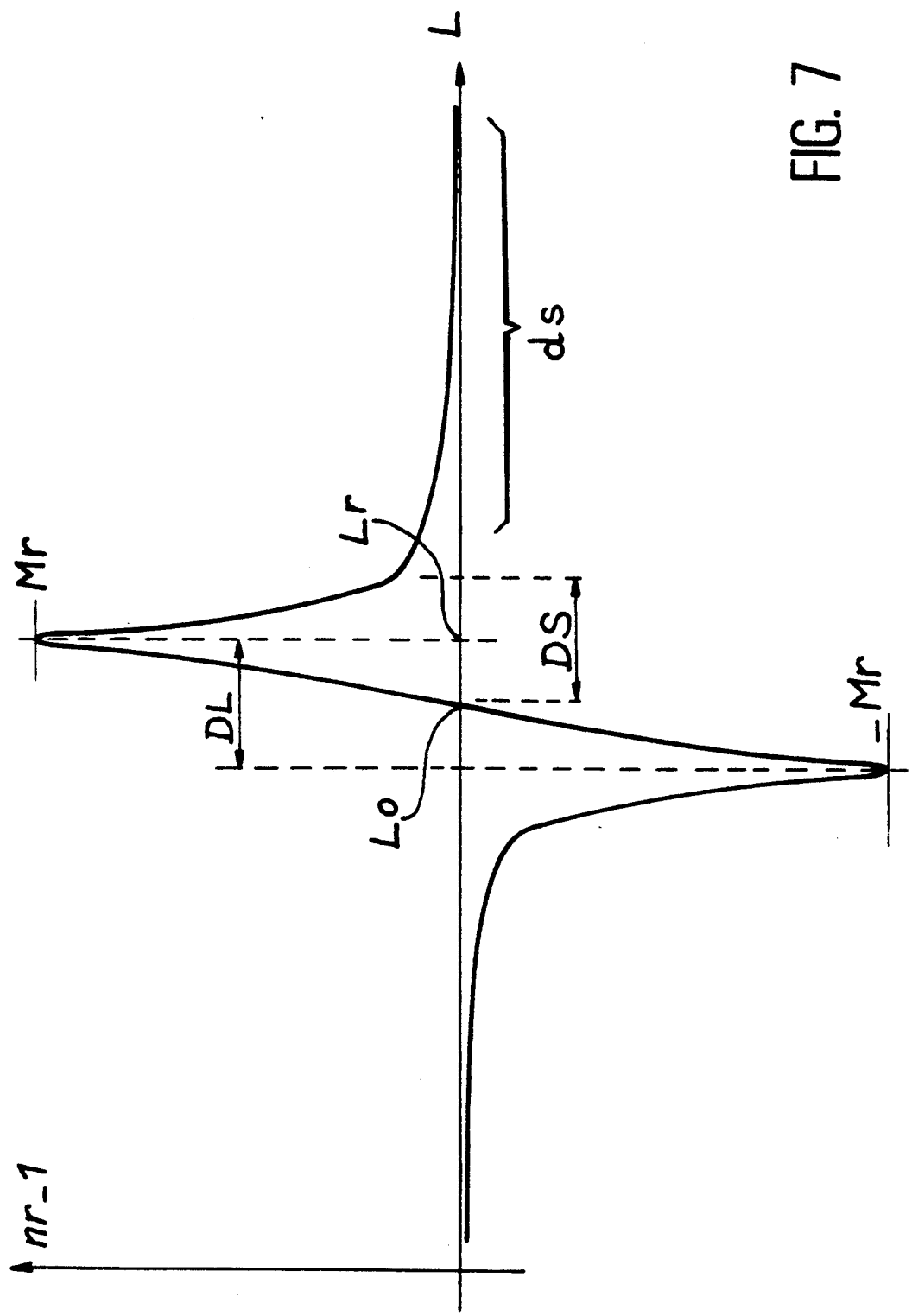
FIG. 7 represents the curve of the variations of nr−1 according to the wavelength L.

There now followers an explanation of the differences between the present invention and the technique described in article (2) by Pantell and al and the article (3) by Reid and al with reference to the curve of FIG. 7 which represents the variations of (nr−1) according to L in the vicinity of the resonance. On this curve, which is in fact the type of curve shown on FIG. 3A with, however, an abscissa axis orientated in the opposite direction (since it corresponds to wavelengths and not frequencies), Lo is the central resonance wavelength (Lo=2pi.c/wo) and DL is the "line width", the difference between the wavelength Lr relating to the maximum (Mr) of the curve and the wavelength relating to the minimum (−Mr) of the curve.

As regards this type of curve, reference can be made to the book by Siegman and entitled "Lasers", University Science Books, p. 102-108, as well as to the CRC Handbook of Chemistry and Physics (section entitled "Line Spectra of the Elements").

In free electron lasers described in articles (2) and (3), modification of the laser tuning condition is obtained by modifying the refraction index of the gaseous medium filling the laser cavity without gas resonance gas.

In these articles (2) and (3), a continuous refraction index is proposed within a wide spectral range ds included between near-infrared and a wavelength Lmin of about 1200 Å (120 nm), the gas being hyrogen with Lo being equal to 949 Å (94.9 nm).

The authors of these articles (2) and (3) do not use any position in the vicinity of the resonance of the hydrogen and are not seeking to exploit its properties.

Since they consider positions which are far from the gas resonance lines, these authors are able to obtain significant variation of the gas refraction index only when establishing a high gas pressure of about $10^2$ Pa to $10^5$ Pa in the laser cavity.

As such pressures are totally incompatible with a sound functioning of the electrons accelerator designed to inject these pressures into the free electron laser, the authors of the article (2) and (3) use a material separation between the accelerator and the cavity of the free electron laser.

This separation is effected with the aid of a boron nitride membrane with a thickness of 1.3 micrometers, which constitutes a fragile element of the system due to heating of the membrane caused by the passage of the beam of electrons.

The method described in articles (2) and (3) makes it possible to build a tunable laser whose wavelength is made to vary by varying the pressure of the gas in the laser cavity.

The present invention differs considerably from the technique described in article (2) and (3) since it uses a tuning of the laser on the gas resonance line (or one of the lines), that is on a wavelength of the interval DS ranging from Lr-(DL/2) to Lr+(DL/2), preferably at the center Lr of this interval.

The invention uses the quite considerable variations of the gas refraction index at its resonance line or each of its resonance lines. As regards the resonance line or each resonance line in question, the refraction index variation is sufficiently large so that the laser is able to be tuned on this line even when establishing in the laser cavity an extremely low gas pressure which may be about $10^{-5}$ to $10^{-1}$ Pa, values being much lower than those used by the authors of the articles (2) and (3).

Thus, in the present invention, tuning of the laser is effected at the resonance line in question. There is no continuous variation of the line, but, on the contrary, an adjustment on the resonance line or on one of the resonance lines of the gas introduced into the laser cavity. As a result, there is a stabilization effect of the laser line and a highly monochromatic laser emission.

In the present invention, it is possible to envisage causing the emission frequency of the free electrons laser to vary, but this variation is discontinuous since passage occurs from one gas resonance line to a contiguous line (provided this gas has a plurality of resonance lines).

The implementation of the present invention is much simpler than that of the technique described in articles (2) and (3). In fact, the invention may be implemented with an extremely low gas pressure in the laser cavity and it is thus extremely easy to separate the latter from the accelerator. In order to do this, it is possible to use a simple diaphragm whose opening has a diameter slightly larger than that of the beam of electrons (less than 1 cm) or two diaphragms similar to the preceding one and delimiting a differential pumping space.

Furthermore, the possibility of using a low gas pressure makes it possible to more easily maintain a narrow speed distribution for the beam of electrons (Dirac type distribution), since the collisions of the beam of electrons with the gas are then $10^5$ to $10^7$ less frequency than in the technique described in the documents (2) and (3).

The invention can be applied to gas spectroscopy, gas chemical composition analysis, the selective decomposition of gas molecules by exciting suitably selected resonances (the gas circulating in the laser cavity) and in creating a specific wavelength of a determined gas.

What is claimed is:

1. A free electron laser including:
   a principal chamber traversed by a beam of previously accelerated electrons,
   a wiggler which generates in this principal chamber a periodic magnetic field interacting with the beam of electrons, and
   means to fill the principal chamber with a gas formed of atoms or molecules having at least one resonance line at a determined frequency, wherein said laser further includes means to tune the laser to this resonance line, thereby enabling the laser to produce a light whose frequency is close to said determined frequency.

2. A free electron laser according to claim 1, wherein the means to fill the principal chamber include means for the controlled feeding of this principal chamber with said gas.

3. A free electron laser according to claim 2, wherein the principal chamber is fed with gas at one of its extremities.

4. A free electron laser according to claim 1, wherein, with the beam of electrons originating from an electron accelerator, the laser further includes a differential pumping chamber which connects the principal chamber to a pipe forming part of the accelerator.

5. A free electron laser according to claim 1, wherein it further includes means for recovering the beam of electrons after it has left the principal chamber.

6. A free electron laser according to claim 5, wherein it further includes another differential pumping chamber which connects the principal chamber to the means for recovering the beam of electrons.

7. A method for use of a free electron laser including:
a principal chamber traversed by a beam of previously accelerated electrons, and
a wiggler which generates in this principal chamber a periodic magnetic field interacting with the beam of electrons,
a method by which the principal chamber is filled with a gas formed of atoms or molecules having at least one resonance line at a determined frequency, wherein the laser is tuned on this resonance line, thereby enabling the laser to produce a light where frequency is close to said determined frequency.

8. Method according to claim 7, wherein the laser is approximately tuned on the wavelength corresponding to the maximum of the curve representing the variations of $(n_r - 1)$ according to the wavelength in the vicinity of resonance, where $n_r$ is the real part of the gas refraction index.

* * * * *